(No Model.)
J. W. PERTZ.
RADIATOR.
No. 511,027. Patented Dec. 19, 1893.
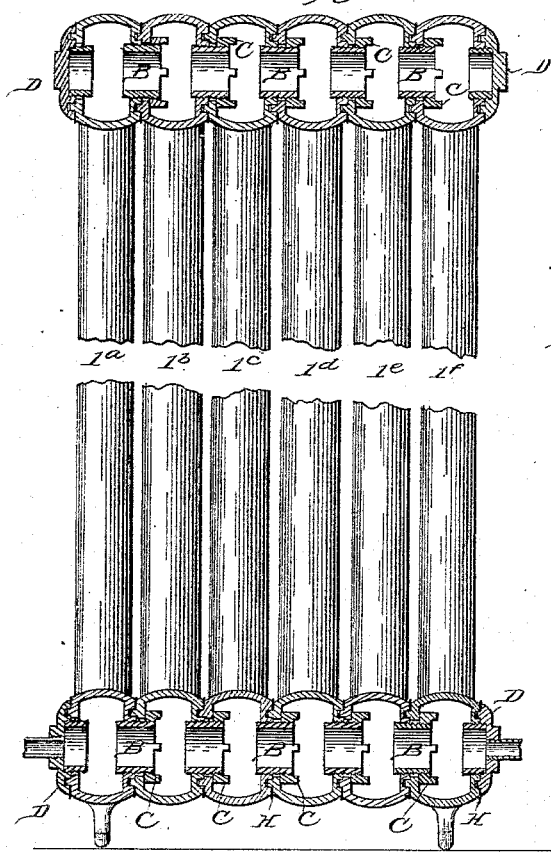
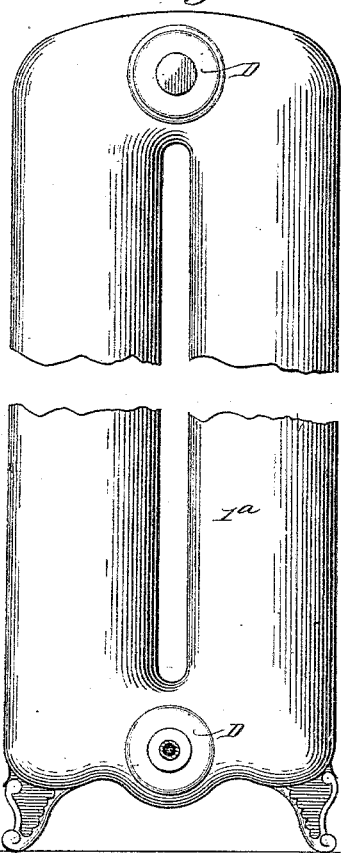
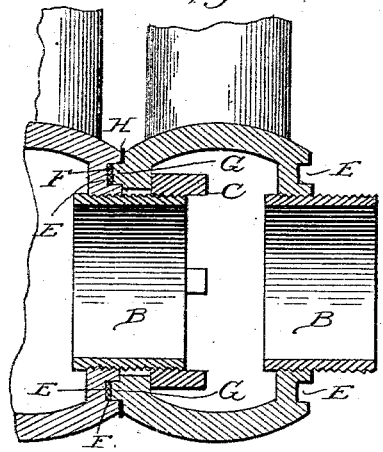
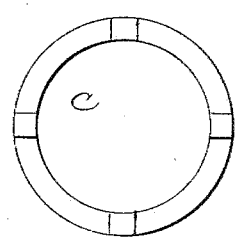
Witnesses:
Inventor:
John W. Pertz
By F. W. Ritter Jr.
Atty.

UNITED STATES PATENT OFFICE.

JOHN WM. PERTZ, OF KOKOMO, INDIANA.

RADIATOR.

SPECIFICATION forming part of Letters Patent No. 511,027, dated December 19, 1893.

Application filed June 2, 1893. Serial No. 476,394. (No model.)

*To all whom it may concern:*

Be it known that I, JOHN WM. PERTZ, a citizen of the United States, residing at Kokomo, in the county of Howard, State of Indiana, have invented certain new and useful Improvements in Steam or Hot-Water Radiators; and I hereby declare the following to be a full, clear, and exact description of the same, reference being had to the accompanying drawings, wherein—

Figure 1 is a longitudinal vertical central section of a radiator embodying my invention—parts broken away. Fig. 2 is an end elevation of one of the radiator loops, parts broken away. Fig. 3 is an enlarged, detail sectional view of a portion of two loops showing the manner and means for coupling the loops. Fig. 4 is a detached view of one of the nipples used in coupling the loops. Fig. 5 is a side elevation of one of the nuts used in coupling the loops, and Fig. 6 is a plan or face view of said nut.

Like symbols refer to like parts wherever they occur.

My invention relates to means for coupling the sections or loops, of loop radiators, and has for its objects, first, to obtain a simple, and efficient and steam tight coupling for radiator loops, and, second, to so unite the couplings with the loops, that each section will be complete in itself, and there shall be no liability of separation or loss of the coupling pertaining to any particular section. To this end I secure the nipple of the coupling to the loop by casting one upon the other, and I insert the nut or nuts, within the core at the time of casting, said nut or nuts being of greater diameter than the ports of the loop, so that the nut or nuts can not thereafter escape from the loop.

The first feature of my invention, therefore, embraces an integral or cast radiator loop having inclosed therein a coupling nut of greater diameter than the ports of said loop; and the second feature embraces an integral or cast radiator loop having a coupling nipple permanently connected—or substantially integral—therewith, and an inclosed coupling nut of greater diameter than the port or ports of the loop.

I will now proceed to describe my invention more fully so that others skilled in the art to which it appertains may apply the same.

In the drawings, $1^a$, $1^b$, indicate a series of radiator loops, coupled up to form a steam or hot water radiator. Each of said loops is, or may be, provided at top and bottom, with the usual ports or passages, in certain of which are secured the coupling pipes or nipples B, B; the coupling being completed by nuts C within the loop.

The leading section $1^a$ of the radiator may have nipples B, for all its ports, (see Fig. 1,) and for the exposed end nipples of the radiator, threaded coupling caps or disks D will be provided. The loops are also each provided on one face with annular recesses E, surrounding the ports for the reception of a soft rubber packing or equivalent gasket F, and at a corresponding position on the other face with annular projections G, to bear on the gasket on the coupling section or loop. Between each section and encircling the gasket F is inserted a lead or soft metal packing H.

In constructing the radiator sections, I arrange or insert in the core for the section, one or more nuts C (according to the number of couplings required) of greater diameter than the proposed ports of the radiator, and in the mold at points corresponding to said ports, one or more nipples B—the nipples and nuts being adapted to each other, after which I cast the radiator loop in the usual way—whereby I obtain radiator sections having the nipples of a coupling integral therewith, and the nuts for a coupling trapped or permanently inclosed by the loop. A radiator of any desired number of sections, may then be constructed from such loops by coupling the sections in the ordinary manner, using for said purpose, any wrench which can be inserted through the port of the loop and which will take firm hold on the nut.

I have herein described the best method known to me of carrying out my invention, but I do not wish to be limited thereto, as it will be evident to a person skilled in the art that the invention in its application may be considerably modified without departing from the spirit of my invention; as for instance the nipples need not necessarily be cast in the loop, but may be screwed therein if preferred.

Having thus described my invention, what I claim, and desire to secure by Letters Patent, is—

1. An integral or cast radiator loop provided with suitable port or ports, and containing within it a coupling nut or nuts of greater diameter than the radiator ports; substantially as and for the purposes specified.

2. An integral or cast radiator loop having a port or ports provided with permanent coupling nipples, and containing a coupling nut or nuts of greater diameter than the ports of the radiator; substantially as and for the purposes specified.

In testimony whereof I affix my signature, in presence of two witnesses, this 31st day of May, 1893.

JOHN WM. PERTZ.

Witnesses:
J. D. JOHNSON,
BELLE HAMILTON.